May 15, 1962 — E. P. SHAW — 3,034,359
LINE SAMPLING VALVE
Filed April 18, 1958 — 4 Sheets-Sheet 1
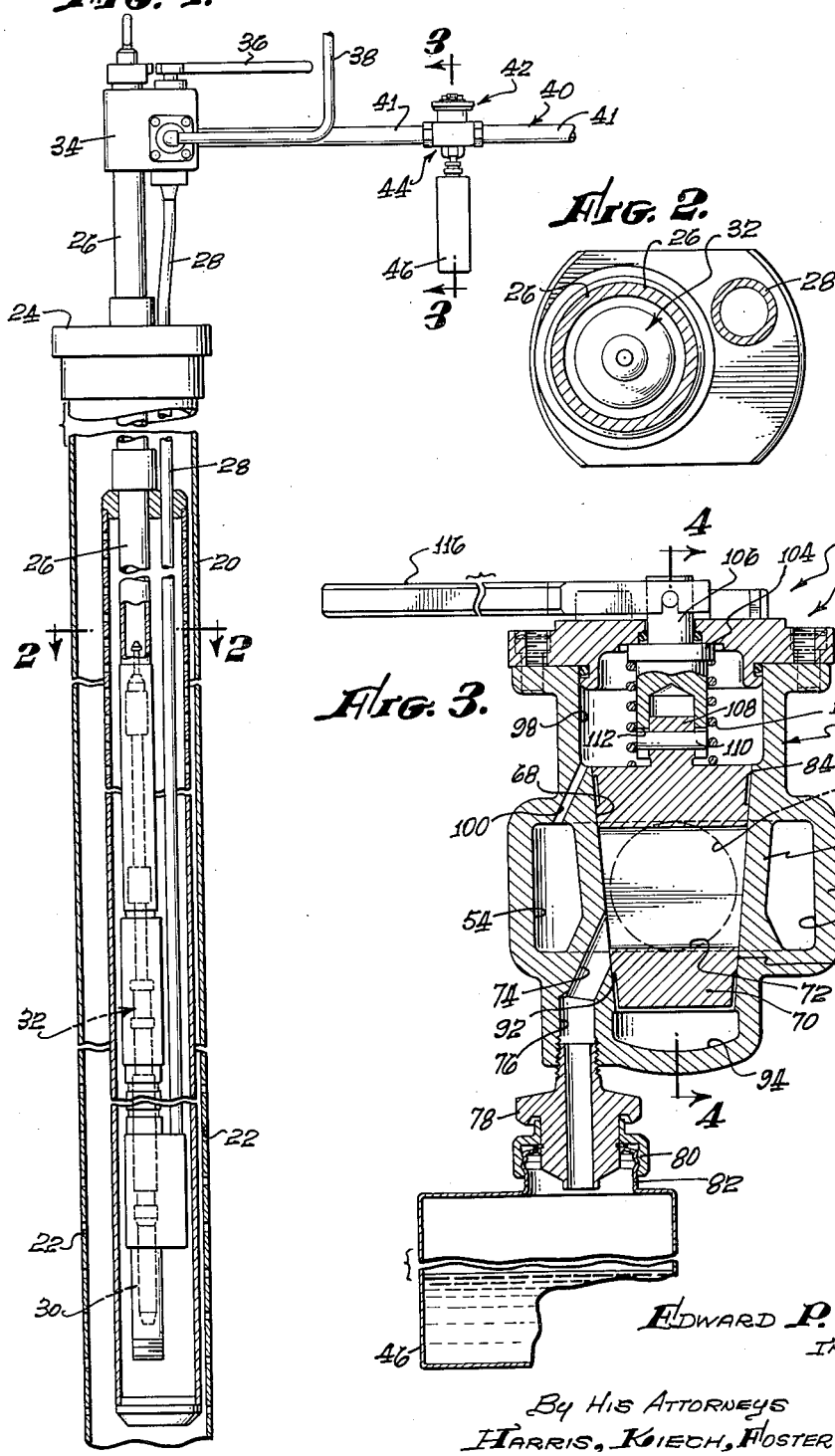
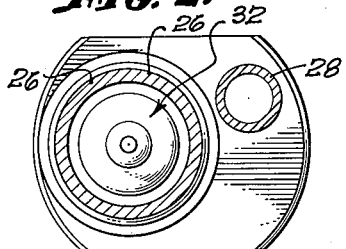
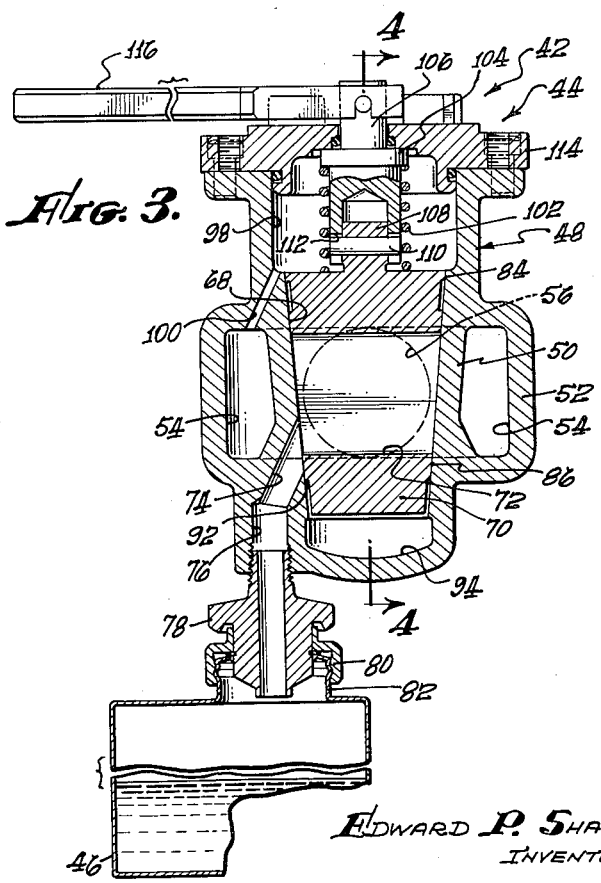
Edward P. Shaw, INVENTOR
By His Attorneys
Harris, Kiech, Foster & Harris

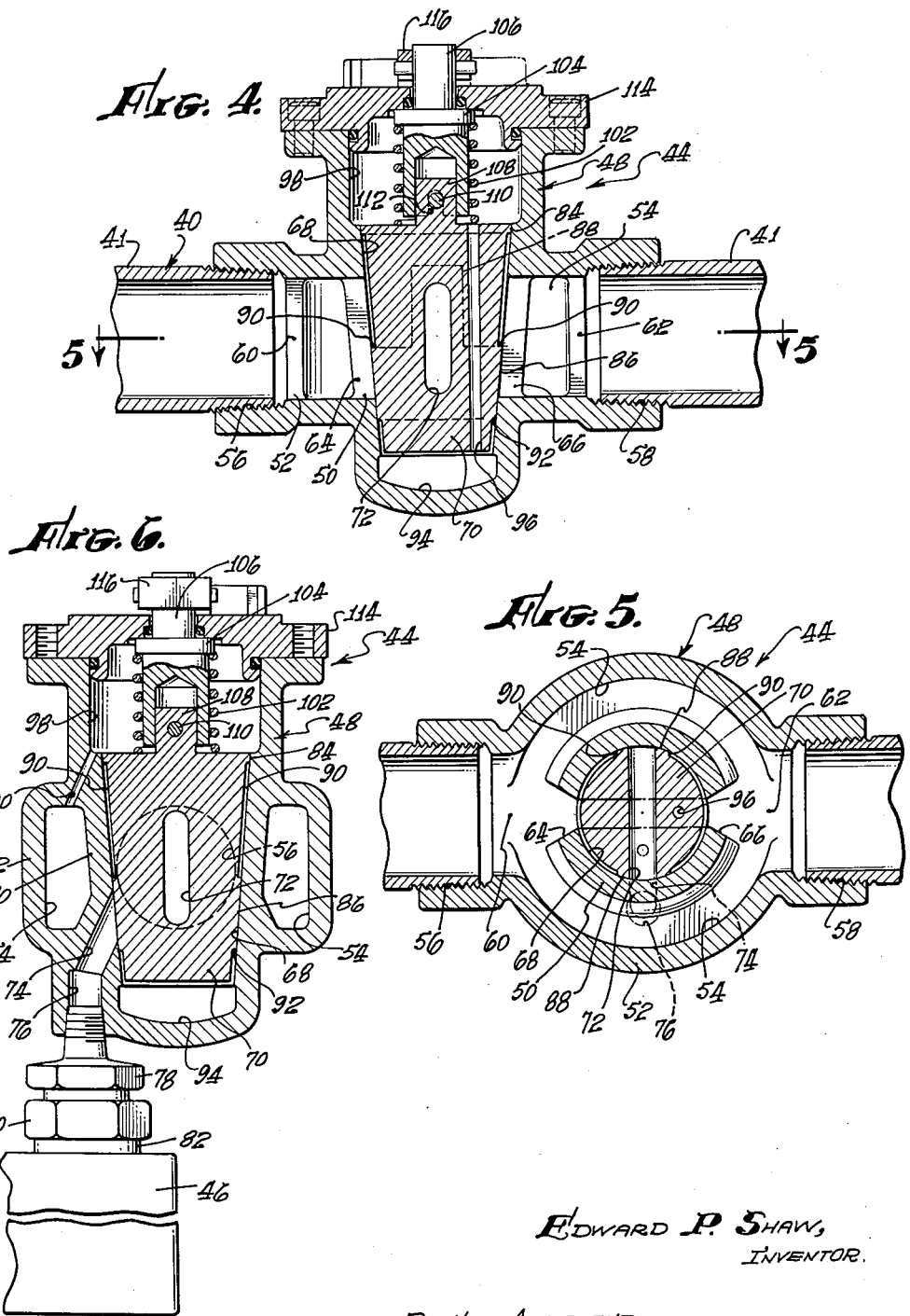

May 15, 1962 E. P. SHAW 3,034,359
LINE SAMPLING VALVE
Filed April 18, 1958 4 Sheets-Sheet 3
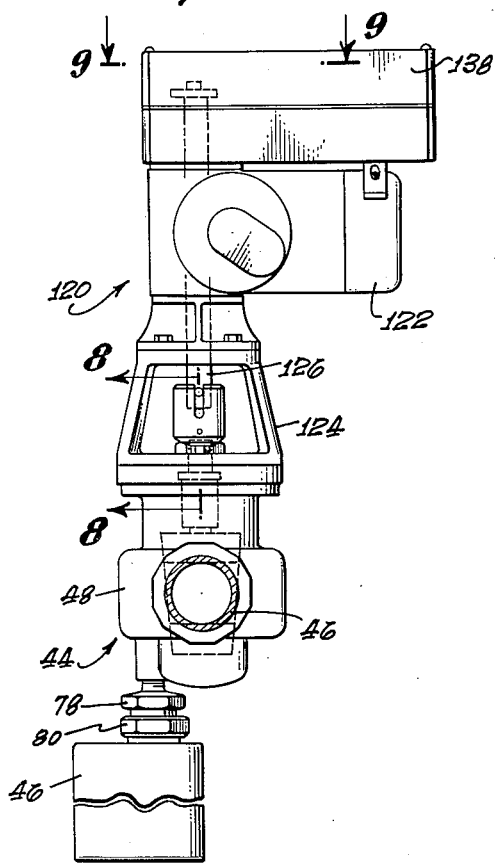
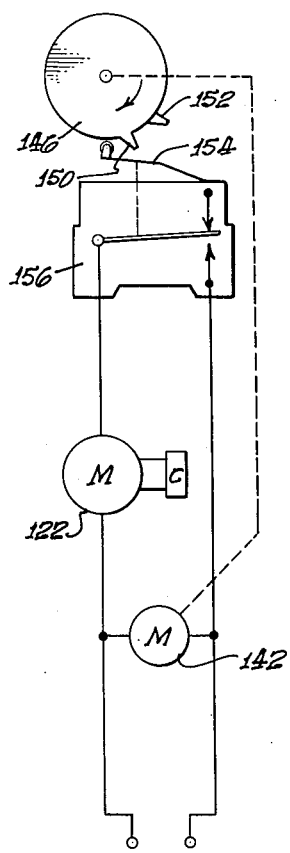
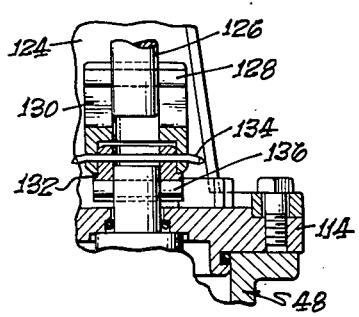
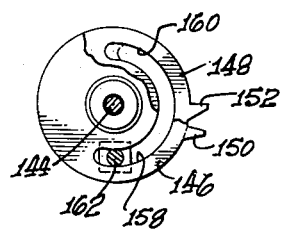
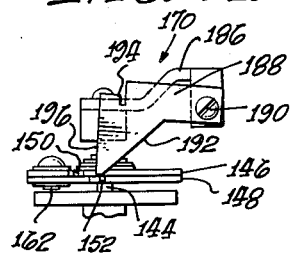
Edward P. Shaw,
INVENTOR.
By His Attorneys.
Harris, Kiech, Foster & Harris.

Edward P. Shaw,
INVENTOR.

By His Attorneys
Harris, Kiech, Foster & Harris.

United States Patent Office 3,034,359
Patented May 15, 1962

3,034,359
LINE SAMPLING VALVE
Edward P. Shaw, 1709 Pine St., Huntington Beach, Calif.
Filed Apr. 18, 1958, Ser. No. 729,298
7 Claims. (Cl. 73—422)

The present invention relates in general to sampling devices and, more particularly, to a sampling valve for withdrawing representative samples of fluid from a fluid line periodically. For example, the sampling valve of the invention may be utilized to obtain periodic, representative samples of production fluid from an oil pipe line leading from an oil well so that the water content and A.P.I. gravity of the oil may be determined accurately without any necessity for running the production fluid into a settling tank for such purpose. However, other uses of the invention are possible also, such as reversing the sampling flow pattern, thereby injecting instead of ejecting the fluid with respect to the flow stream.

A primary object of the invention is to provide a sampling valve provided with flow channels or passages which are so related in position that a truly representative sample flows through a sampling passage of the valve. In other words, a primary object of the invention is to provide a sampling valve wherein the sampling passage is so located relative to other passages or channels through the valve that the representativeness of the sample flowing into the sampling passage is not adversely affected by turbulence, eddies, and the like.

More particularly, an important object of the invention is to provide a sampling valve which includes: a valve body comprising spaced, concentric inner and outer housings which are substantially circular in cross section and which provide therebetween two spaced, substantially semicircular bypass channels of equal size separating in a zone of divergence and meeting in a zone of confluence, the outer housing being provided with inlet and outlet ports connectible in the fluid line and respectively communicating with the zones of divergence and confluence, and the inner housing being provided with inlet and outlet ports respectively communicating with the zones of divergence and confluence and being provided with a discharge port between the inlet and outlet ports therein; and a valve member in the inner housing and having a sampling passage therethrough, the valve member being movable between a flow position, wherein the sampling passage connects the inlet and outlet ports in the inner housing so that fluid flowing through the fluid line flows through the sampling passage as well as the bypass channels, and a sampling position wherein the sampling passage communicates with the discharge port to discharge the sample trapped in the sampling passage, the fluid flowing through the fluid line flowing only through the bypass channels when the valve member is in its sampling position.

With the foregoing construction, the flow through the fluid line divides into two equal streams bypassing the sampling valve member on both sides, and the inlet port which leads to the sampling passage in the valve member when the valve member is in its flow position is exposed to the full dynamic pressure of the flow through the fluid line. Consequently, the flow through the sampling passage in the valve member when the latter is in its flow position is truly representative of the flow through the fluid line, it being impossible for eddies or other turbulence to prevent the flow of a representative stream through the sampling passage in the valve member when in its flow position. Therefore, when the valve member is moved into its sampling position wherein the sampling passage communicates with the discharge port to discharge the sample trapped in the sampling passage, a truly representative sample is obtained, which is an important feature of the invention.

Another object of the invention is to provide a sampling valve wherein the inlet and outlet ports in the outer housing, the zones of divergence and confluence of the streams flowing through the two bypass channels, and the inlet and outlet ports in the inner housing are all in linear alignment. This further insures smooth flow conducive to representative sampling. The sampling and bypassing passages are of the same height as the pipe so that, in the preferred horizontal mounting, a representative sample is obtained even though the water in the pipe may be stratified in its lower section.

Another object of the invention is to provide a sampling apparatus which includes timer means for periodically moving the sampling valve member between its flow and sampling positions so that the valve member is alternately in its flow position to obtain a sample and its sampling position to discharge the sample. In this manner, a representative average sample is obtained automatically.

Another object is to provide a line sampling apparatus wherein the timer means maintains the sampling valve member in its flow position throughout a predetermined portion of each cycle, the valve member being in its sampling position throughout the remainder of the cycle. With this construction, the sampling valve member can be made to remain in the sampling position of the optimum time to adequately drain samples of widely differing viscosities.

Another object is to provide an actuator for moving the valve member between its flow and sampling positions which is controlled by the timer means, and to provide control means actuable by the actuator for deenergizing the actuator whenever the actuator has moved the valve member into one or the other of its flow and sampling positions. This insures against overrunning of the valve member beyond the position into which it is to be moved, which is an important feature.

More particularly, an object of the invention is to provide means, including the timer means, for periodically energizing the actuator, cam means actuable by the actuator, and means connecting such cam means and the timer means for advancing the timer means to a position to deenergize the actuator upon arrival of the valve member at the desired flow or sampling position.

Another object is to provide an apparatus wherein the connecting means between the cam means and the timer means includes lever means actuable by the cam means and ratchet and pawl means interconnecting such lever means and the timer means.

The foregoing objects, advantages, features and results of the present invention, together with other objects, advantages, features and results thereof which will be apparent to those skilled in the art in the light of this disclosure, may be attained with the exemplary embodiments of the invention described in detail hereinafter and illustrated in the accompanying drawings, in which:

FIG. 1 is a utility view, partially in elevation and partially in vertical section, showing on a reduced scale an open, fluid operated, oil well pumping system with which the invention is particularly useful;

FIG. 2 is an enlarged, fragmentary sectional view taken along the arrowed line 2—2 of FIG 1;

FIG. 3 is an enlarged sectional view of one embodiment of the sampling valve of the invention and is taken along the arrowed line 3—3 of FIG. 1;

FIG. 4 is a sectional view taken along the arrowed line 4—4 of FIG. 3.

FIG. 5 is a sectional view taken along the arrowed line 5—5 of FIG. 4;

FIG. 6 is a sectional view similar to FIG. 3, but showing the sampling valve member of the sampling valve in its flow position, the sampling valve member being shown in its sampling position in FIG. 3;

FIG. 7 is an elevational view of an automatic, periodic line sampling apparatus of the invention which incorporates the sampling valve of FIGS. 3 to 6;

FIG. 8 is an enlarged, fragmentary sectional view taken along the arrowed line 8—8 of FIG. 7;

FIG. 11 is a view taken along the arrowed line 11—11 of FIG. 10;

FIG. 12 is a sectional view taken along the arrowed line 12—12 of FIG. 10; and

FIG. 13 is a wiring diagram showing schematically the electric circuit of the line sampling apparatus of FIGS. 7 to 12.

Figure 9:
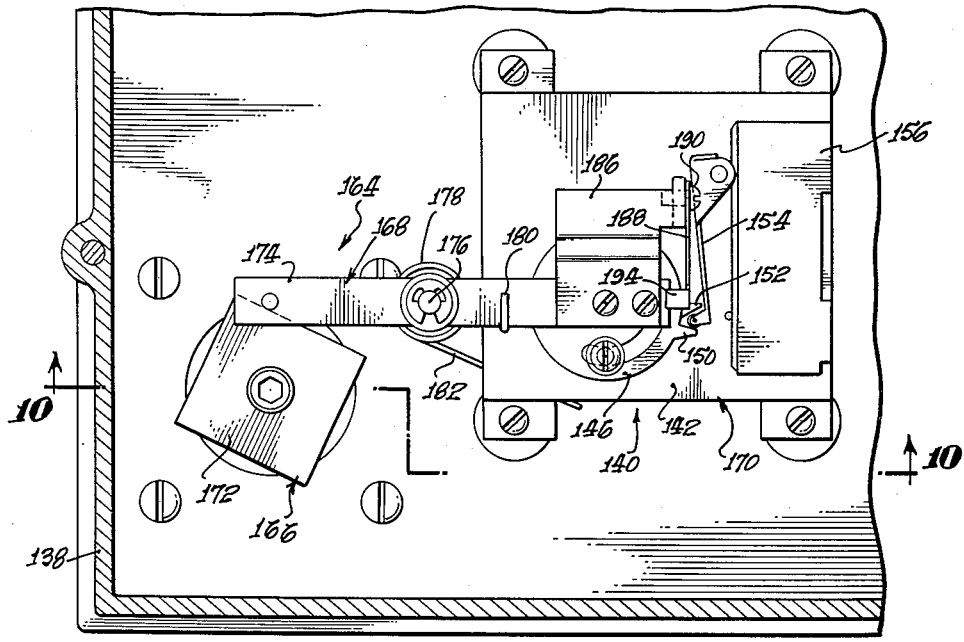
FIG. 9 is an enlarged, fragmentary sectional view taken along the arrowed line 9—9 of FIG. 7.

Referring to FIG. 1 of the drawings, the numeral 20 designates an oil well casing provided with perforations 22 to admit into the casing production fluid from surrounding productive formations, which production fluid may be oil, or an emulsion or mixture of oil and water, and the like. Suspended from a casing head 24 at the upper end of the casing 20 is a fluid operated pumping system similar to that disclosed in United States Patent No. 2,568,320, issued September 18, 1951 to Clarence J. Coberly. This pumping system includes an operating fluid or power tubing 26 and a production tubing 28. At the bottom of the power tubing 26 is an inlet fitting 30 which admits production fluid from the well into and serves as a seat for a fluid operated, bottom hole pump 32 of the so-called free type. The pump 32 is provided with the usual reciprocatory motor and pump sections, the motor section being actuated by operating fluid under pressure supplied thereto through the power tubing 26 to cause the pump section to pump production fluid from the well upwardly through the production tubing 28 to the surface.

The power and production tubings 26 and 28 are connected at their upper ends to a pump head 34 containing valve means, not shown, operable by a handle 36 to regulate fluid flow through the pumping system. In one operative position of the handle 36, operating fluid under pressure from a suitable source flows from an operating fluid supply line 38 into the power tubing 26 to operate the pump 32, and production fluid flowing upwardly through the production tubing 28 enters a production fluid line 40 leading to a suitable point of storage, or the like. With the handle 36 in another operative position, the flow through the system is reversed, the operating fluid under pressure being delivered to the production tubing 28 so that it acts on the lower end of the pump 32 to move the pump upwardly through the power tubing 26 to the surface, as is well known in the art.

The foregoing pumping system is a so-called open system, which means that the spent operating fluid supplied to the pump 32 through the power tubing 26 is mixed with the production fluid pumped from the well by the pump 32 and is returned to the surface through the production tubing 28 along with the production fluid from the well. For reasons which will appear hereinafter, the present invention is of particular utility in conjunction with such an open pumping system, although it may also be utilized in connection with a so-called closed system, wherein the production fluid from the well and the spent operating fluid are returned to the surface through separate production and return tubings. Also, the invention may be utilized in connection with oil well pumping systems of other types, and in a more general sense, may be utilized in connection with any fluid line.

In producing oil with a pumping system of the nature hereinbefore described, or with pumping systems of other types, the production fluid line 40 sometimes discharges into a gauging tank. After a suitable settling period, any water in the production fluid is drawn off and the net oil production measured. This procedure provides an accurate means of gauging the actual oil production, which is important for any well, but which is particularly important where the well is on leased property so that the actual oil production must be determined very accurately for the purpose of royalty payments. However, the use of a gauging tank for each well is not always possible, particularly in town lot and offshore fields.

Another way of determining the actual or net oil production is to determine the gross production with a meter and to determine the percentage water content with a sampling device, thereby avoiding any necessity for a guaging tank for each well. This procedure requires very accurate sampling to establish the net oil production accurately, particularly in the case of a fluid operated pumping system of the open type. As hereinbefore stated, in such a system, the spent operating fluid is mixed with the production fluid from the well and is returned to the surface through the production tubing 28. Under such conditions, if the water cut is high, it is difficult to determine the true oil production accurately by metering and sampling techniques, especially if the net oil production is small. In such a case, the net oil production is the difference between two large quantities, which is difficult to determine accurately. As an example, assume that the pump 32 has a 1:1 ratio and is operating at 100% efficiency, 200 barrels of fluid will be returned to the surface through the production tubing 28 for every 100 barrels of oil supplied to the pump through the power tubing 26, the flows through the operating fluid supply and production fluid lines 38 and 40 being determined by suitable accurate meters, not shown. Under such conditions, if the water cut with respect to the 200 barrels of fluid flowing through the production fluid line 40 is 50%, this means that the production fluid is all water and that the net oil production is zero. However, if the water cut with respect to the mixture flowing through the production fluid line 40 is 45%, this means that the mixture consists of 100 barrels of power oil, 90 barrels of water and 10 barrels of native oil, as compared to no native oil when the water cut relative to the mixture is 50%. Obviously, an error of 1% in determining the water cut with respect to the mixture amounts to an error of 2 barrels with respect to the native oil production from the well, which is an error of 20% when the native oil production is 10 barrels. Of course, when the production fluid from the well contains a higher proportion of native oil, a given error in determining the water cut does not result in so large an error in the determination of the native oil production, but errors in determining the water cut become insignificant only when the actual oil production is relatively large.

In a closed fluid operated pumping system, wherein the spent power oil is returned to the surface separately, the problem is not as severe. For example, with a 90% water cut under these conditions, an error of 1% in determining the water cut amounts to an error of 10%, instead of 20%, in the determination of the net oil production. Of course, in a closed system, it is necessary to account for leakage of power oil into the production fluid system in the pump 32, but such leakage can be measured readily by accurately gauging the make-up power oil introduced into the power oil system.

With the foregoing background in mind, the purpose of the present invention is to provide a sampling apparatus which is capable of obtaining accurately representative samples of the fluid flowing through the production fluid line 40, or other fluid lines, so that, in the particular application of the invention being considered herein, the average water content of the fluid may be determined extremely accurately.

FIG. 1 of the drawing shows a sampling apparatus 42 of the invention inserted between sections 41 of the production fluid line 40 for the purpose of accurately determining the average water content of the fluid flowing through such line. This sampling apparatus includes a sampling valve 44 and a receptacle 46 for the sample.

Referring to FIGS. 3 to 6 of the drawings, the sampling valve 44 includes a valve body 48 having radially spaced, substantially circular, concentric, integral inner and outer housings 50 and 52 which provide therebetween two transversely spaced, generally semicircular bypass channels 54 of equal size. The outer housing 52 is provided on opposite sides of the valve body 48 with axially aligned ports 56 and 58 into which the sections 41 of the production fluid line 40 are threaded. The ports 56 and 58, will, for convenience, be referred to hereinafter as inlet and outlet ports, respectively, although, as will become apparent, flow through the sampling valve 44 may take place in either direction. Considering the ports 56 and 58 as inlet and outlet ports, respectively, it will be apparent that fluid flow through the sampling valve 44 divides into two streams of equal size, the entering stream dividing into two equal parts in a zone of divergence 60 and these parts meeting again in a zone of confluence 62.

The inner housing 50 is provided with ports 64 and 66 which will be referred to hereinafter as inlet and outlet ports, respectively, for consistency, although it will be understood that these ports may be either inlet or outlet ports depending on the direction of flow through the sampling valve 44. The inlet and outlet ports 64 and 66 are elongated slots which are generally parallel to the axis of the concentric inner and outer housings 50 and 52 and which converge radially inwardly, thereby providing them with relatively wide outer ends and relatively narrow inner ends. The inlet and outlet ports 56 and 58, the zones of divergence and confluence 60 and 62, and the inlet and outlet ports 64 and 66 are all in linear alignment for reasons to be discussed.

The inner housing 50 provides a frusto-conical chamber 68 for a frusto-conical plug valve member 70 having therethrough a sampling passage 72 the configuration of which corresponds to the configuration of the inner ends of the inlet and outlet ports 64 and 66. When the valve member 70 is in what will be referred to hereinafter as its flow position, the sampling passage 72, which is a straight passage through the valve member, registers with the inlet and outlet ports 64 and 66. Under such conditions, fluid flowing through the line 40 flows through the sampling passage 72 in the valve member 70 as well as through the semi-circular bypass channels 54. The symmetrical relationship shown between the sampling passage 72, when the valve member 70 is in its flow position, and the bypass channels 54 results in smooth flow with a minimum of turbulence. Also, the inlet port 64 is exposed to the full dynamic pressure of the fluid flowing through the line 40. Consequently, the fluid flowing through the sampling passage 72 when the valve member 70 is in its flow position is a truly representative sample of the total flow, there being no possibility with the symmetrical passage-channel arrangement shown of the formation of eddies in the vicinities of the inlet and outlet ports 64 and 66 which might interfere with obtaining a truly representative sample flow through the sampling passage 72, this being an important feature of the invention.

It will be noted that while the valve member 70 has been described as being in its flow position when the sampling passage 72 registers with the inlet and outlet ports 64 and 66, the valve member actually has two flow positions spaced 180° apart. The valve member 70 is also rotatable about the axis of the inner and outer housings 50 and 52 between two sampling positions spaced 180° apart and spaced 90° from the flow positions. When the valve member 70 is in either of its sampling positions, the sampling passage 72 therethrough is out of communication with the inlet and outlet ports 64 and 66 and is in communication with a discharge port 74 in the inner housing 50. This discharge port, as best shown in FIG. 3, communicates with the bottom of the sampling passage 72 when the valve member 70 is in its sampling position, whereby the sample trapped in the sampling passage upon rotation of the valve member from one of its flow positions into such sampling position may drain through the discharge port. The lower end of the discharge port 74 communicates with a passage 76 into which is threaded a fitting 78 carrying a cap 80 into which a neck 82 on the sampling receptacle 46 may be threaded, the sampling receptacle being supported by the fitting 78 and the cap 80 in the construction illustrated. With this construction, the receptacle 46 may be removed periodically and replaced by another one, the removed receptacle being permitted to stand for a length of time sufficient to insure adequate settling out of any water in the sample. Such water may then be drawn off in any suitable manner, not shown, to obtain an accurate measurement of the proportion of oil present.

The valve member 70 is provided with a relatively narrow annular land 84 at its larger end and a wider annular land 86 adjacent its smaller end, the land 86 sealing the discharge port 74 from the inlet and outlet ports 64 and 66 in all positions of the valve member 70. Integral with the annular land 86 are lands 88 which encompass portions of the ends of the sampling passage 72, the remaining portions of the ends of this passage being encompassed by portions of the annular land 86. When the valve member 70 is in its sampling position, wherein the sampling passage 72 is in communication with the discharge port 74, the annular land 86 and the lands 88 prevent communication between the bypass channels 54 and the sampling passage. Thus, the land 86 seals the discharge port 74, as shown in FIG. 6, when the valve member 70 is in its flow positions, and the lands 86 and 88 seal the sampling passage 72 relative to the bypass channels 54 when the valve member 70 is in its sampling positions. With these lands on the valve member 70, a recess 90 between the land 84 and the lands 86 and 88 is exposed to line pressure when the valve member is in its sampling positions. Also, a recess 92 adjacent the smaller end of the valve member 70 is exposed to line pressure at all times through a chamber 94 in the valve body 48 adjacent the smaller end of the valve member, a longitudinal passage 96 through the valve member, a chamber 98 in the valve body adjacent the larger end of the valve member, and a passage 100, FIGS. 3 and 6, connecting the chamber 98 to one of the bypass channels 54.

The foregoing system of lands on valve member 70 provides the ability to obtain the most effective fluid seal with the least amount of torque required to turn the valve member. An effective fluid seal is of great importance in maintaining the representativeness of the sample, because any leakage into the sampling receptacle 46 while the valve member 70 is in the flow positions might contaminate the sample with non-representative fluid and would in addition, provide a larger sample than is desired, with the danger of overflowing the sampling receptacle 46. In order to obtain this effective fluid seal, a significant sealing pressure must exist between the valve member 70 and the frusto-conical chamber 68. This implies the ues of a considerable biasing force applied to valve member 70 to seat it properly in the chamber 68. This force would create a frictional resistance to turning which must be overcome by the actuating motor 122, thereby dictating the use of a relatively larger and heavier motor than would be required if this torque requirement were kept to a minimum.

By the use of the system of lands hereinbefore described, the torque requirement is reduced in two ways. First, the lands provide a minimum area of contact between the valve member 70 and the chamber 68, and therefore a minimum area which is subject to pressure differences and thus to resulting end load unbalance. By keeping this hydraulic unbalance to a minimum and adding a small bias by a compression spring 102, I can reduce to a minimum the effect of increasing line pressure on the increase in the force on the valve member and hence on torque required to turn it. The second effect of the system of lands on reducing torque is the provision of a minimum contact area between the valve member 70 and the chamber 68, so that the necessary sealing pressure between the surfaces can be obtained with a relatively small downward force. With this smaller force, the friction resisting turning is correspondingly lowered and with it, the required motor torque.

It will be noted that the recesses 90 and 92 also insure adequate lubrication of the valve member 70 and the peripheral wall of its chamber 68.

The shaft 106 has a tubular portion which is telescoped over a stem 108 on the valve 70, the shaft 106 and the stem 108 being interconnected by a pin 110 extending through the stem 108 and disposed in notches 112 in the shaft. The collar 104 is seated against a closure 114 for the chamber 98, the shaft 106 projecting through such closure and having a handle 116 connected thereto. The purpose of this handle is, of course, to provide a manual actuating means for rotating the valve member 70 between its flow and sampling positions.

Considering the over-all operation of the sampling apparatus 42, with the pump 32 in operation to pump a mixture of native well fluid and spent power oil through the production fluid line 40, the operator periodically moves the valve member 70 from one of its flow positions to one of its sampling positions and again to one of its flow positions, whereby the sampling passage 72 through the valve member is alternately in communication with the fluid line 40 through the inlet and outlet ports 64 and 66 and in communication with the discharge port 74. The valve member 70 is permitted to remain in its flow positions for a period of time sufficient to insure obtaining a truly representative sample, the representativeness of which is enhanced by the symmetrical passage-channel construction shown for reasons hereinbefore discussed. The valve member 70 is permitted to remain in its sampling positions for a period of time sufficient to insure draining of the sample trapped in the sampling passage 72.

By repeating the foregoing operations at relatively frequent intervals, e.g., intervals of one hour, for a prolonged period, e.g., 24 hours, a representative average sample is obtained in the receptacle 46. This sample may then be permitted to remain quiescent long enough to insure complete settling out of the water therein, whereupon the relative proportions of oil and water may be determined. The result is an accurate measurement of the water cut.

Turning now to FIGS. 7 to 13 of the drawings, illustrated therein is a sampling apparatus 120 which automatically rotates the valve member 70 of the sampling valve 44 from one of its flow and sampling positions to the next periodically so that a representative average sample is obtained in the receptacle 46 completely automatically. The sampling apparatus 120 includes an actuator in the form of an electric motor 122 which is mounted on a base 124 carried by the valve body 48. The motor 122, through suitable gearing which is not shown, drives a shaft 126 one end of which is coupled to the shaft 106 described previously. As shown in FIG. 8 of the drawings, the shaft 126 carries a pin 128 disposed in notches in a coupling member 130, the latter being connected to a coupling member 132 by a shear pin 134. The coupling member 132 is provided with notches therein to receive a pin 136 through the shaft 106.

As willl be apparent, whenever the motor 122 rotates the shaft 126 through 90°, the valve member 70 is rotated from one of its flow and sampling positions to the next. Contained in a housing 138 mounted on the motor 122 is a means for advancing the valve member 70 by increments of 90° at predetermined intervals, as will now be described.

Figure 10:
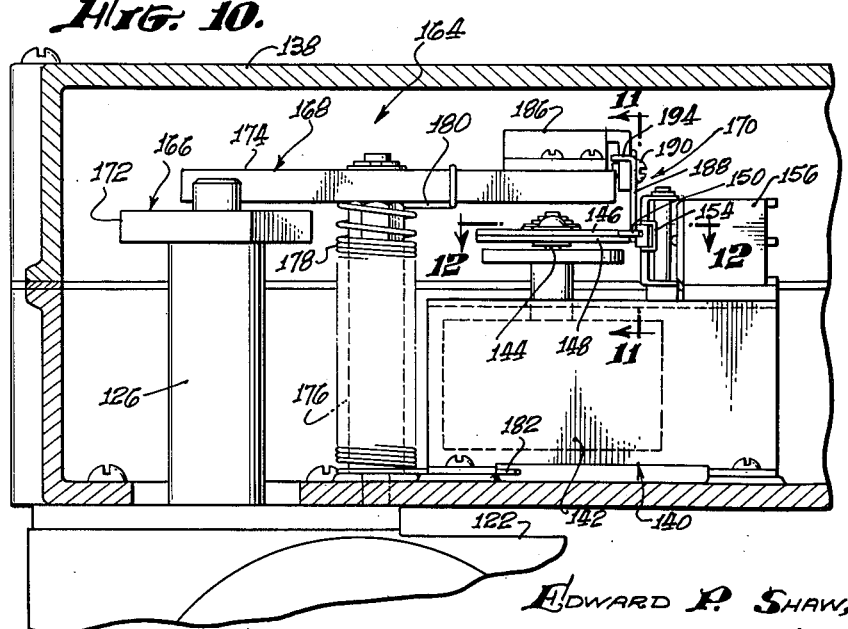
FIG. 10 is a sectional view taken along the arrowed line 10—10 of FIG. 9.

As best shown in FIGS. 9 and 10 of the drawings, the housing 138 contains a timer means 140 which includes a timing motor 142 driving a shaft 144 which carries two cams 146 and 148, these cams being frictionally mounted on the timing shaft 144 so that they may slip relative thereto upon application of a sufficiently large force, the reason for this being discussed hereinafter.

As best shown in FIG. 12, the cams 146 and 148 are provided with lobes 150 and 152, respectively, which are engageable with an actuating arm 154, FIGS. 9 and 13, of a switch 156 in series with the motor 122 and in parallel with the timing motor 142. Whenever one of the lobes 150 and 152 engages the switch actuating arm 154, the switch 156 is closed, as will be apparent from FIG. 13, to energize the motor 122 so that this motor drives the valve member 70 through the shaft 126. The purpose of the lobe 150 is to cause the motor 122 to move the valve member 70 from one of its flow positions to one of its sampling positions, and the purpose of the lobe 152 is to cause the motor to subsequently move the valve member from such sampling position to the next flow position. Thus, throughout the larger angular distance between the lobes 150 and 152, the valve member 70 is in one of its flow positions, which angular distance may correspond to a period of, for example, 56 minutes out of 60. The smaller angular distance between the lobes 150 and 152 corresponds to the interval that the valve member 70 is in each sampling position, which interval may, for example, amount to 4 minutes out of 60, this interval being only long enough to insure complete draining of the sample from the sampling passage 72 through the discharge port 74. Thus, with this construction, the valve member 70 is in its flow positions most of the time to minimize flow resistance through the line 40, which is an important feature.

Since oils of different viscosities may require different time intervals to insure complete drainage of the sampling passage 72, the angular distances between the lobes 150 and 152 of the cams 146 and 148 are variable. As shown in FIG. 12 of the drawings, the two cams 146 and 148 are provided with arcuate slots 158 and 160, respectively, a bolt 162 for clamping the cams together with the lobes 150 and 152 in any desired angular relationship extending through the slots 158 and 160. With this construction, the portion of the operating cycle during which the valve member 70 remains in one or other of its sampling positions may be increased or decreased, depending on the time required to insure substantially complete drainage of the sampling passage 72 as the result of differences in viscosity or other factors.

In order to insure that the valve member 70 will be advanced exactly 90° each time the switch 156 is closed, thereby insuring accurate positioning of the valve member in its flow and sampling positions, control means 164 actuable by the motor 122 is provided to deenergize the motor whenever the motor has moved the valve member from one of its flow and sampling positions to the next. In the construction illustrated, this control means includes cam means 166 on the shaft 126, lever means 168 engaging such cam means, and ratchet and pawl means 170 interconnecting the lever means and the timer cams 146 and 148.

The cam means 166 merely comprises a square cam 172 fixed on one end of the shaft 126. As will be apparent, the reason for the square cam 172 is that the valve member 70 is moved in steps of 90°.

The lever means 168 includes a lever 174 which is pivoted on a post 176 carried by the housing 138. A torsion spring 178 encircling the post 176 biases one end of the lever 174 into engagement with the cams 172, this spring having an end 180 engaging the lever and an end 182 anchored relative to the housing 138. In other words, the torsion spring 178 biases the lever 174 in the counterclockwise direction, as viewed in FIG. 9.

The other end of the lever 174 carries a bracket 186 on which a pawl 188, best shown in FIG. 11, is pivotally mounted at 190. When the pawl 188 moves to the right, as viewed in FIG. 11, due to counterclockwise pivoting of the lever 174 under the influence of the cam 172 and the torsion spring 178, an inclined edge 192 of the pawl engages one or the other of the cam lobes 150 and 152 to pivot the pawl upwardly, downward pivoting of the pawl being limited by engagement of a tab 194 thereon with the adjacent end of the lever 174. However, when the lever 174 is pivoted in the clockwise direction, as viewed in FIG. 9, the pawl 188 is moved to the left, as viewed in FIG. 11, and an edge 196 of the pawl can engage one or the other of the cam lobes 150 and 152 to move the cam lobes into positions such that neither closes the switch 156, whereupon the motor 122 is deenergized to stop the valve member 70 in precisely the right position as will be discussed in more detail in the succeeding paragraphs.

Considering the over-all operation of the sampling apparatus 120, it will be assumed that valve member 70 is in its flow position, wherein the sampling passage 72 therethrough is in communication with the ports 64 and 66, and thus in communication with the line 40. The valve member 70 remains in this position until the timer cam lobe 150 engages the switch actuating arm 154.

When the timer cam lobe 150 engages the switch actuating arm 154, it closes the switch 156 to energize the motor 122. Thereupon, the motor 122 drives the shaft 126 to rotate the valve member 70 from the flow position in which it is disposed to one of its sampling positions so that the fluid sample trapped in the sampling passage 72 may drain through the discharge port 74 into the receptacle 46. As the shaft 126 is rotated through 90° to rotate the valve member 70 from one of its flow positions to the adjacent sampling position, the square cam 172 first pivots the lever 174 in a direction to permit the pawl 188 to ride over the cam lobe 150, and thereafter pivots the lever 174 in the opposite direction to cause the edge 196 of the pawl to engage the cam lobe 150. When this occurs, the pawl 188 causes the cams 146 and 148 to slip relative to the timing shaft 144 into a position such that the cam lobe 150 disengages the switch actuating arm 154 to permit the switch 156 to open. At this point, the cam 172 and the valve member 70 have been rotated through exactly 90°, so that the motor 122 stops with the valve member 70 precisely in one of its sampling positions. The accuracy of this positioning is further improved by the use of a cam which by virtue of its square shape provides greatest movement of lever 174 for a given rotation of cam 172 at the desired stopping position.

After an interval of time sufficient to insure complete drainage of the trapped sample from the sampling passage 72 into the receptacle 46 through the discharge port 74, the cam lobe 152 engages the switch actuating arm to close the switch 156. Thereupon, the motor 122 rotates the valve member 70 and the cam 172 through another 90° to move the valve member from one of the sampling positions to the next flow position. As before, the lever 174 is first rocked in the counterclockwise direction to cause the pawl 188 to ride over the cam lobe 152, and then is rocked in the clockwise direction to cause the pawl 188 to engage the cam lobe 152 and rotate the cams 146 and 148 relative to the timing shaft 144 into a position such that the cam lobe 152 disengages the switch actuating arm 154 to deenergize the motor 122. Again, this has the effect of deenergizing the motor 122 after exactly 90° of rotation of the valve member 70 and the cam 172, whereupon the valve member 70 stops in exact alignment with one of its flow positions. The valve member remains in this flow position until the cam lobe 150 once again engages the switch actuating arm 154, whereupon the foregoing sequence of events is repeated.

Thus, the sampling apparatus 120 constitutes a completely automatic apparatus for obtaining a representative average sample of the fluid flowing through the fluid line 40.

Although exemplary embodiments of the present invention have been disclosed herein for purposes of illustration, it will be understood that various changes, modifications, and substitutions may be incorporated in such embodiments without departing from the spirit of the invention as defined by the claims which follow.

I claim:

1. In a sampling apparatus for sampling flow through a fluid line, the combination of: a sampling valve having inlet and outlet ports connectible in the fluid line and connected by a flow channel, said sampling valve having a discharge port between said inlet and outlet ports and including a valve member provided with a flow passage therethrough, said valve member being movable between a flow position, wherein said passage connects said inlet and outlet ports so that fluid flowing through the fluid line flows through said passage as well as through said channel, and a sampling position wherein said passage communicates with said discharge port to discharge fluid trapped in said passage, fluid flowing through the fluid line flowing through only said channel when said valve member is in said sampling position; an energizable actuator connected to said valve member for alternately moving said valve member from said flow position into said sampling position and from said sampling position into said flow position; energizing means, includng timer means, for periodically energizing said actuator so as to alternately move said valve member from said flow position into said sampling position and from said sampling position into said flow position; and control means actuable by said actuator for deenergizing said actuator whenever said actuator moves said valve member into one of said flow and sampling positions.

2. In a sampling apparatus for sampling flow through a fluid line, the combination of: a sampling valve having inlet and outlet ports connectible in the fluid line and connected by a flow channel, said sampling valve having a discharge port between said inlet and outlet ports and including a valve member provided with a flow passage therethrough, said valve member being movable between a flow position, wherein said passage connects said inlet and outlet ports so that fluid flowing through the fluid line flows through said passage as well as through said channel, and a sampling position wherein said passage communicates with said discharge port to discharge fluid trapped in said passage, fluid flowing through the fluid line flowing through only said channel when said valve member is in said sampling position; an energizable actuator connected to said valve member for alternately moving said valve member from said flow position into said sampling position and from said sampling position into said flow position; energizing means, including timer means, for periodically energizing said actuator so as to alternately move said valve member from said flow position into said sampling position and from said sampling position into said flow position; and control means actuable by said actuator for deenergizing said actuator whenever said actuator moves said valve member into one of said flow and sampling positions, said control means including cam means actuable by said actuator, and including means connecting said cam means and said timer means for moving said timer means to a position wherein it deenergizes said actuator.

3. In a sampling apparatus for sampling flow through a fluid line, the combination of: a sampling valve having inlet and outlet ports connectible in the fluid line and connected by a flow channel, said sampling valve having a discharge port between said inlet and outlet ports and including a valve member provided with a flow passage therethrough, said valve member being movable between a flow position, wherein said passage connects said inlet and outlet ports so that fluid flowing through the fluid line flows through said passage as well as through said channel, and a sampling position wherein said passage communicates with said discharge port to discharge fluid trapped in said passage, fluid flowing through the fluid line flowing through only said channel when said valve member is in said sampling position; an energizable actuator connected to said valve member for alternately moving said valve member from said flow position into said sampling position and from said sampling position into said flow position; energizing means, including timer means, for periodically energizing said actuator so as to alternately move said valve member from said flow position into said sampling position and from said sampling position into said flow position; and control means actuable by said actuator for deenergizing said actuator whenever said actuator moves said valve member into one of said flow and sampling positions, said control means including cam means actuable by said actuator, and including mechanical means interconnecting said cam means and said timer means for advancing said timer means to a position wherein it deenergizes said actuator.

4. In a sampling apparatus for sampling flow through a fluid line, the combination of: a sampling valve having inlet and outlet ports connectible in the fluid line and connected by a flow channel, said sampling valve having a discharge port between said inlet and outlet ports and including a valve member provided with a flow passage therethrough, said valve member being movable between a flow position wherein said passage connects said inlet and outlet ports so that fluid flowing through the fluid line flows through said passage as well as through said channel, and a sampling position wherein said passage communicates with said discharge port to discharge fluid trapped in said passage, fluid flowing through the fluid line flowing through only said channel when said valve member is in said sampling position; an energizable actuator connected to said valve member for alternately moving said valve member from said flow position into said sampling position and from said sampling position into said flow position; energizing means, including timer means, for periodically energizing said actuator so as to alternately move said valve member from said flow position into said sampling position and from said sampling position into said flow position; and control means actuable by said actuator for deenergizing said actuator whenever said actuator moves said valve member into one of said flow and sampling positions, said control means including cam means actuable by said actuator, and including mechanical means interconnecting said cam means and said timer means for advancing said timer means to a position wherein it deenergizes said actuator, said mechanical means including lever means engaging said cam means and including ratchet and pawl means on said lever means and said timer means.

5. In a sampling apparatus for sampling flow through a fluid line, the combination of: a sampling valve having inlet and outlet ports connectible in the fluid line and connected by a flow channel, said sampling valve having a discharge port between said inlet and outlet ports and including a valve member provided with a flow passage therethrough, said valve member being movable between a flow position, wherein said passage connects said inlet and outlet ports so that fluid flowing through the fluid line flows through said passage as well as through said channel, and a sampling position wherein said passage communicates with said discharge port to discharge fluid trapped in said passage, fluid flowing through the fluid line flowing through only said channel when said valve member is in said sampling position; an energizable actuator connected to said valve member for alternately moving said valve member from said flow position into said sampling position and from said sampling position into said flow position; and energizing means, including timer means, for periodically energizing said actuator so as to alternately move said valve member from said flow position into said sampling position and from said sampling position into said flow position, said timer means including means for energizing said actuator to move said valve member from said sampling position to said flow position after one time interval, and including means for energizing said actuator to move said valve member from said flow position to said sampling position after another, longer time interval.

6. In a sampling valve insertable into a fluid line, the combination of: a valve body including a valve chamber of circular horizontal cross section bounded by a peripheral wall, said valve body having circumferentially and horizontally spaced inlet, outlet and discharge ports formed in said peripheral wall, said valve body having a horizontal flow channel interconnecting said inlet and outlet ports and bypassing said valve chamber; and a valve member of circular horizontal cross section disposed in and rotatable about the axis of said valve chamber between a flow position and a sampling position, said valve member having a horizontal flow passage therethrough which communicates at its ends with said inlet and outlet ports, respectively, when said valve member is in said flow position, said passage communicating at one end with said discharge port when said valve member is in said sampling position, the horizontal width of said passage being less than the horizontal spacings of said discharge port from said inlet and outlet ports so that said passage cannot connect said discharge port to said inlet and outlet ports in any position of said valve member, said valve chamber and said valve member being tapered, said valve member having adjacent its larger end an annular land engaging said peripheral wall and having adjacent its smaller end another annular land which engages said peripheral wall and which includes portions encompassing the ends of said passage, said another annular land covering said discharge port when said valve member is in said flow position.

7. A sampling valve according to claim 6 wherein said valve member has on its larger end a stem extending through said valve body, said valve including passage means connecting said flow channel to said ends of said valve member, and said valve including a compression spring encircling said stem and seated against said valve body and the larger end of said valve member.

References Cited in the file of this patent

UNITED STATES PATENTS

| | | |
|---|---|---|
| 1,562,121 | Newton | Nov. 17, 1925 |
| 2,558,387 | Ray | June 26, 1951 |
| 2,692,502 | Warren | Oct. 26, 1954 |
| 2,864,254 | McDonald et al. | Dec. 16, 1958 |